UNITED STATES PATENT OFFICE.

EDWARD J. SHEEHAN, OF NEW YORK, N. Y., ASSIGNOR TO SAN GABRIEL VALLEY FRUIT PRODUCTS COMPANY, OF NEW YORK, N. Y., A CORPORATION OF NEW YORK.

OLEORESIN OF VANILLA.

931,805.        Specification of Letters Patent.        Patented Aug. 24, 1909.

No Drawing.        Application filed September 27, 1907.        Serial No. 394,922.

*To all whom it may concern:*

Be it known that I, EDWARD J. SHEEHAN, a citizen of the United States, residing in the city of New York, State of New York, have invented and discovered a certain new and useful Oleoresinous Product from Vanilla-Beans, which I term "oleoresin of vanilla," and of which the following is a full, clear, and exact description.

Heretofore the only known extracts from the vanilla bean, so far as I am aware, are the commercial product "vanillin" and tinctures derived by alcoholic extraction, and commonly called tincture of vanilla. My newly discovered product differs therefrom principally in that it is an oleo-resinous extract from the vanilla bean, and contains not alone the vanillin principle but a large part of the group of resins constituent in the bean and consisting of both acid and neutral resins; the production thereof, in my new oleo-resinous extract having been suggested by the fact that in these odoriferous resins a large part of the flavoring quality of the bean resides; and which, when present with the vanillin principle, and when most of the fatty acids are eliminated, makes a wholly new product well adapted for culinary use and far more effective in flavoring powers than any of the known commercial extracts of vanilla.

I do not assert that it was not well known that the bean contained a group of neutral and acid resins, waxes and fatty acids, as this has been described in Vol. 9 page 1289 of the *Berichte of the German Chemical Society*, detailing the studies of Tiemann upon the composition of the vanilla bean and of his first synthesis of vanillin, and the further fact that from the fats present may be liberated unpleasant smelling fatty acids; but he made no quantitative determination of these constituents, nor any disclosure of their effect on the vanillin principle, nor any suggestion that an oleoresinous extract, as distinguished from an oily extract or tincture derived by alcoholic extraction of vanilla from the vanillin in the bean or from the crystallized vanillin, synthetically derived, could be obtained and prove useful; nor that the odoriferous quality resident in the constituent resins, and supplementing or modifying the odor of the vanillin largely, if not wholly, belonged as much to the neutral as to the acid group of resins present.

My new product therefore consists of an oleo-resinous extract from the vanilla bean, the constituents of which are the usual percentage of vanillin extracted plus a very large percentage of both the acid and neutral resins, and including only a comparatively small part of the constituent waxes and fats, as hereinafter more particularly stated.

It is identifiable by the following characteristics determinable on analysis. In constituents, determinable by separation, 41 per cent. will be found to be soluble in aqueous alkali, 57 per cent. insoluble in like solution and 2 per cent. insoluble in organic solvents, but mechanically separable. The soluble 41 per cent., treated for extraction of vanillin, by shaking it out in a sodium bi-sulfite solution yielded 10 per cent. of vanillin, reckoned on the original oleo-resin weighed, leaving 31 per cent. for organic acids and acid resins, which had been taken up in the aqueous alkali. These resins are decidedly odoriferous, differing distinctly from vanillin, and giving a new combined flavor to the concrete oleo-resinous product. The 57 per cent. insoluble in aqueous alkali and thus separated as aforesaid, is composed of 41 per cent. of neutral resins and 16 per cent. of fats and waxes; the two latter not contributing to the odoriferous quality, but the neutral resins, like the acid resins, having odoriferous power, supplementing and modifying the odor of the vanillin constituent.

The 41 per cent. of neutral resins extracted, together with the 16 per cent. of fatty oils and waxes, will be found soluble in ether, chloroform, benzene and benzin, but insoluble in alcohol and aqueous alkali. This neutral resinous constituent is of a brownish color and nearly solid consistency, somewhat like a soft paraffin. While not so strong in odor and taste as the constituent acid resins it is distinctly aromatic, undoubtedly modifying the flavor of both the acid resins and the vanillin principle.

The 31 per cent. of organic acid and acid resinous constituent, determinable by separation as aforesaid, is soluble in ether, chloroform, benzene, benzin, alcohol and aqueous alkali; in color it is a yellow amber; has an odor and taste resembling vanillin, but is of a resinous and pasty consistency. By slow sublimation it will yield an acid in fine white crystals melting at 73.5° C. As a further test of identification, and differentiation of my product from the pharmacopœial tincture of vanilla, which gives 10 per cent. of vanillin extracted with 65 per cent. alcohol, my oleoresin so treated yielded 21 per cent. of soluble constituent, of which, assuming that 10 per cent. was vanillin, determined 11 per cent. of the resins taken up in the 65 per cent. alcohol; hence the larger part of the neutral and acid resins present in my product are not taken up, from the bean, in the ordinary known methods of manufacture of tincture of vanilla; moreover the alcoholic solution, in this test of my product, had very little color, whereas both the acid and the neutral resins separated out by the aqueous alkali treatment before described, were deep colored.

The valuable new elements contained in my new product as an extract direct from the vanilla bean are undoubtedly the two classes of acid and acid resins and of neutral resins which together aggregate approximately 72 per cent. of the whole substance and both of which are odoriferous constituents, each contributing to reinforce and modify the flavor of the vanillin; while the remaining 18 per cent., consisting of fatty oils, waxes and non-identifiable solid matter is a negligible part of those elements constituent in the bean.

Doubtless various methods of extracting from the bean, my new oleoresinous product including the substitution of equivalent volatile solvents to those used by me as hereinafter stated, may be devised; but a practical method, to accomplish the object is that employed by me and consisting, essentially, in finely chopping the bean and heating it in a closed container, to a temperature up to boiling point, in the presence of carbon tetrachlorid, acting as a volatile solvent, in the proportion of 5 per cent. by weight, of the material treated, but while I have found that percentage of such solvent to be suitable it may have to be varied slightly, due to differences in the beans from different localities and at different seasons; and while I prefer to heat the mass up to the boiling point, it may be that, for like reasons, a lesser temperature will be sufficient, but this is readily determinable by the described effect to be produced, as hereinafter stated. This treatment may be continued, with fresh carbon tetrachlorid, in like quantity, after an interval of an hour of treatment at such temperature, until the bean is almost if not completely exhausted; but I prefer to draw off the whole contents of the container after the first application of the volatile solvent, and replace the material to be treated with fresh volatile solvent, for a repetition of the first treatment. The solution is then drawn off, boiled, and the solvent recovered, by condensation in the still or otherwise, the new oleo-resinous product remaining at the bottom of the still.

Having thus described my invention, I claim as new and desire to secure by Letters Patent:—

1. The new product described, which is an oleo-resinous extract from vanilla bean, of gummy consistency, a deep brownish-amber color, and containing approximately 10 per cent. of vanillin, and seventy two per cent. approximately of combined acid and neutral resins, the former of which is soluble in aqueous alkali and the latter is not, and both of which are soluble in ether, chloroform and benzin.

2. The new product described, which is an oleo-resinous extract from vanilla bean, containing, in addition to 10 per cent. of vanillin, approximately 72 per cent. of combined acid and neutral resins, of gummy consistency, deep brownish-amber in color, and which on being treated with a 65 per cent. alcoholic solution yields but 11 per cent. of its resinous constituent.

3. The new product described, which is an oleo-resinous extract from vanilla bean, of deep brownish-amber color and gummy consistency, and containing, in addition to 10 per cent. of vanillin, approximately 41 per cent. of neutral resins, of a brownish color, of the consistency of soft paraffin, insoluble in aqueous alkali and alcohol, but soluble in ether, chloroform and benzin.

4. The new product described which is an oleo-resinous extract from vanilla bean, of brownish-amber color and gummy consistency, containing the following constituents determinable by analysis, namely 10 per cent. approximately, of vanillin, 31 per cent approximately of organic acid and acid resins, of amber color, and 41 per cent. approximately of neutral resins, of brownish color, the former being soluble and the latter insoluble, in organic solvents.

5. The new product described, which is an oleo-resinous extract from vanilla bean, of brownish-amber color and gummy consistency, containing the following constituents identifiable by analytical determination, namely 10 per cent. approximately of vanillin, 41 per cent. approximately of neutral resins brownish in color, of the consistency of soft paraffin, insoluble in aqueous alkali but soluble in ether, and 31 per cent. approximately of organic acid and acid resins, amber yellow in color, of pasty consistency, soluble in aqueous alkali and alcohol and yielding on sublimation fine white crystals melting at about 73.5° C.

6. The process of producing the described new oleo-resinous extract from vanilla bean, which consists in heating the finely chopped bean in a closed container in the presence of a volatile solvent such as carbon tetrachlorid, up to boiling point; drawing off the solution and repeating the first step with a fresh supply of the volatile solvent; finally drawing off the solution, boiling it down, removing the solvent, and recovering the oleo-resin as a gummy precipitate.

In testimony whereof, I have hereunto affixed my signature this 19th day of September A. D. 1907.

EDWARD J. SHEEHAN.

Witnesses:
WILLIAM A. LEMCKE,
H. T. FENTON.